June 9, 1925.
O. L. THOMPSON
VEHICLE PARKING ATTACHMENT
Filed June 10, 1924
1,541,670
2 Sheets-Sheet 1
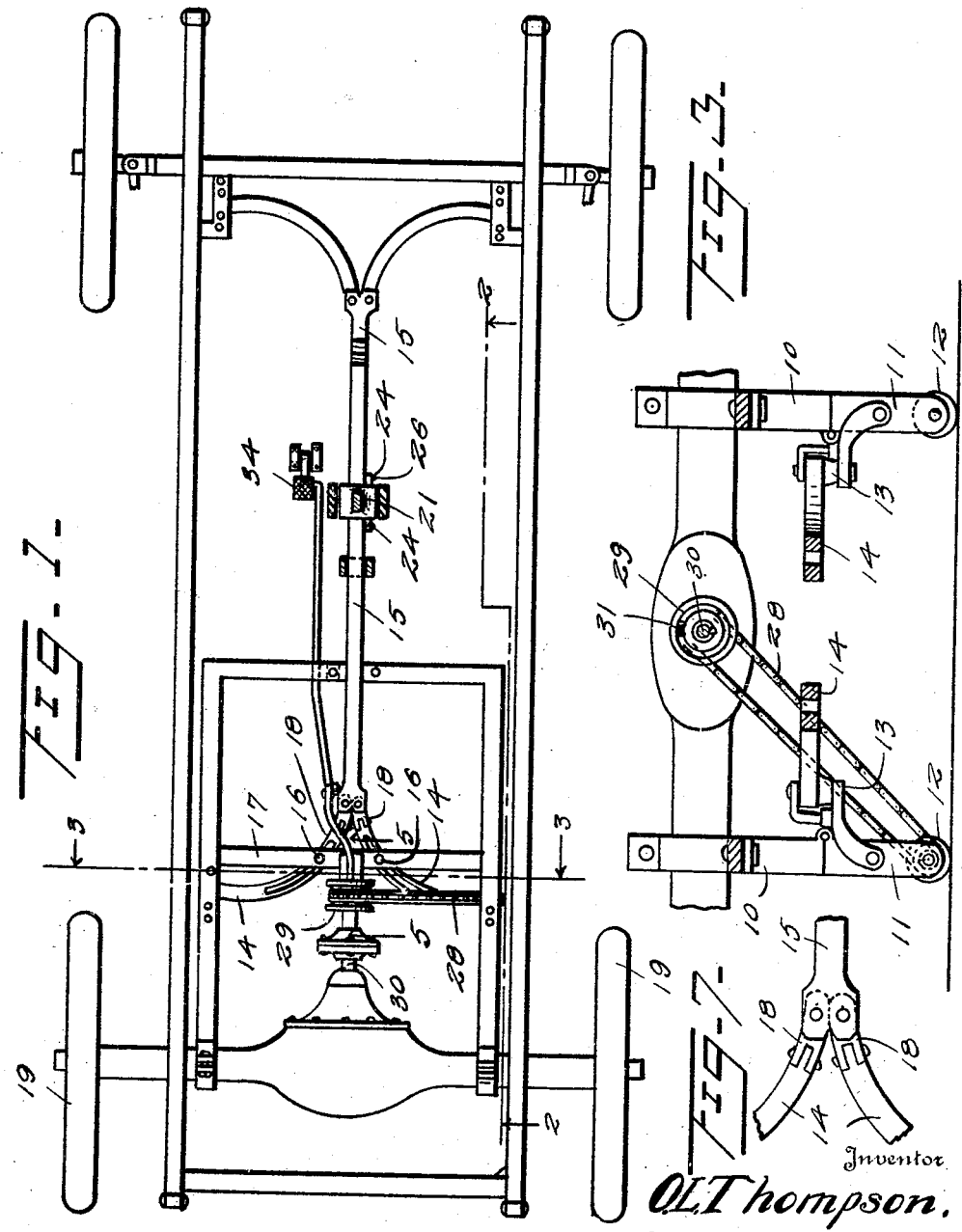
Inventor
O.L.Thompson.
By
Attorney

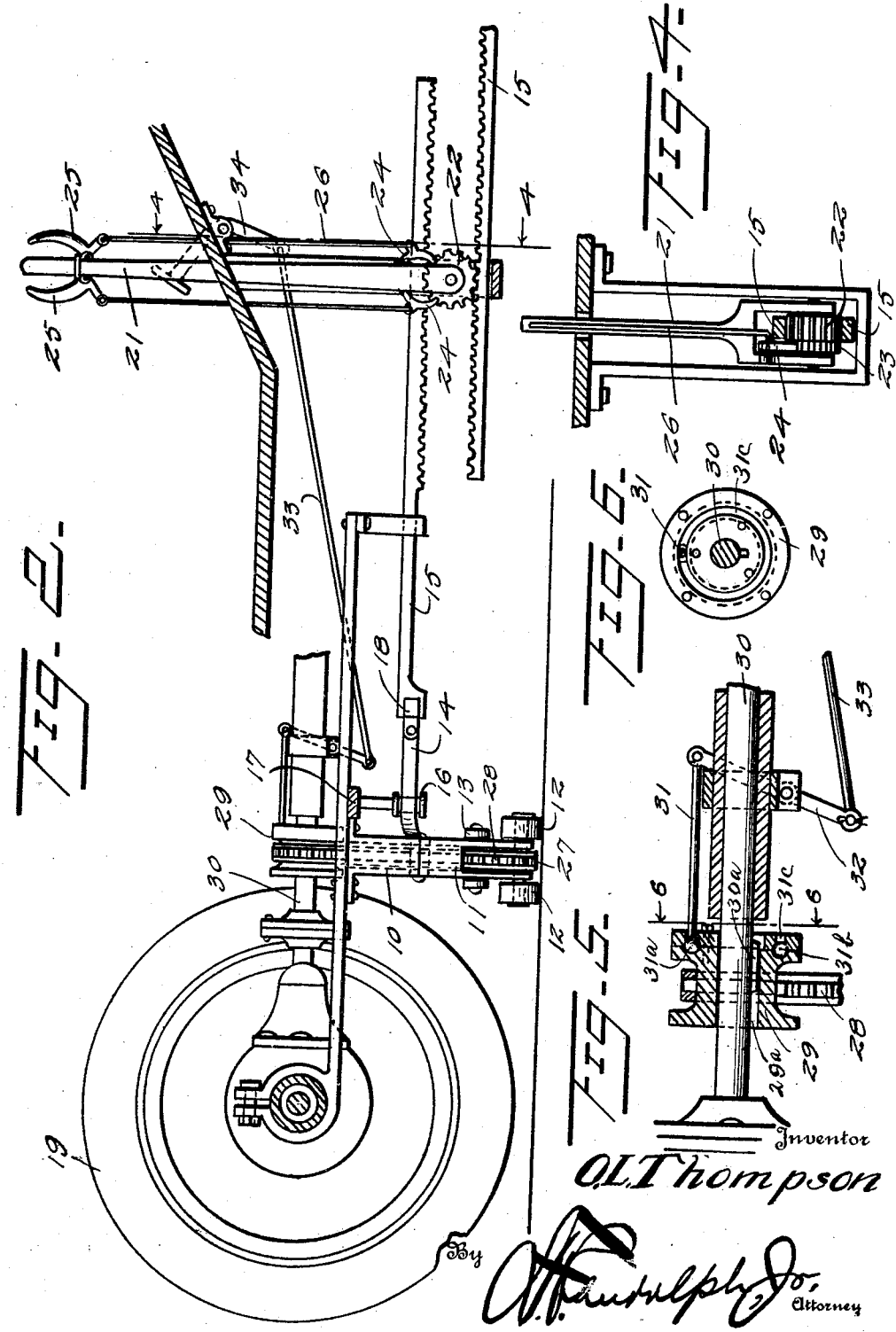

Patented June 9, 1925.

1,541,670

UNITED STATES PATENT OFFICE.

OLIVER L. THOMPSON, OF TULSA, OKLAHOMA.

VEHICLE PARKING ATTACHMENT.

Application filed June 10, 1924. Serial No. 719,152.

*To all whom it may concern:*

Be it known that I, OLIVER L. THOMPSON, a citizen of the United States, residing at Tulsa, in the county of Tulsa and State of Oklahoma, have invented certain new and useful Improvements in Vehicle Parking Attachments; and I do hereby declare the following to be a full, clear, and exact description of the invention, such as will enable others skilled in the art to which it appertains to make and use the same.

The object of this invention is to facilitate the parking of motor vehicles in congested districts where parking space is limited and in accordance with the invention, the vehicle is equipped with an attachment which in operation elevates the vehicle so as to lift the wheels from the ground whereby a lateral movement may be imparted to the vehicle when it is required either to park or to clear the space in which the vehicle has been parked when the space between adjacent cars is just sufficient to contain the car about to be parked or to leave the space in which it has been parked.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view of the chassis of a motor vehicle provided with a parking attachment embodying the invention;

Figure 2 is an enlarged vertical longitudinal section on the line 2—2 of Figure 1, showing the relation of the parts when the vehicle has been elevated to lift the wheels from the ground;

Figure 3 is a transverse section on the line 3—3 of Figure 1, looking to the rear as designated by the arrows;

Figure 4 is a detail sectional view on the line 4—4 of Figure 2;

Figure 5 is an enlarged sectional view on the line 5—5 of Figure 1;

Figure 6 is a sectional view on the line 6—6 of Figure 5; and

Figure 7 is a fragmentary view of a portion of the operating means.

Corresponding and like parts are referred to in the following description and designated in the several views of the drawings by like reference characters.

The device is in the nature of an attachment and may be readily installed upon a motor vehicle and comprises standards which are secured at their upper ends to the chassis in any preferred and substantial way. As shown, the standards are of similar construction and each consists of an upper member 10 which is clamped to the housing of the rear axle and a lower member 11 hingedly connected to the upper member so as to swing upwardly and inwardly. The lower member 11 is provided with a pair of wheels 12 which are adapted to engage and run upon the ground when the member 11 is swung outwardly and downwardly into operative position as indicated most clearly in Figures 2 and 3. A clevis 13 is pivotally connected to the member 11 and a link 14 forms connecting means between the clevis 13 and a longitudinally disposed bar 15. The link 14 is curved throughout its length and longitudinally slotted to receive a pin 16 which is attached to a cross bar 17, said pin forming a guide for the link in the operation of the attachment. A short link 18 pivotally connects the link 14 with the bar 15. Longitudinal movement of the bar 15 in one direction lowers the members 11, and a reverse movement of the bar 15 elevates or holds the members 11 so as to be out of the way when not in active operation. When the members 11 are lowered into operative position, the wheels 12 engage the surface and lift the vehicle so as to elevate the wheels 19 whereby the vehicle may be moved laterally into a parking space or from a parking space as required. The vehicle will be similarly equipped at each end so that it may be moved bodily toward or away from the curb, accordingly as it may be required to park, or clear a parking space.

An operating lever 21 is provided as convenient and effective means for moving the bar 15 longitudinally. A spur wheel 22 is mounted in the lower end of the lever 21 and is provided at one side with a ratchet wheel 23 with which dogs 24 co-operate. The dogs 24 are located upon opposite sides of the lever 21 and are pivoted thereto and each is adapted to be operated by means of a hand latch 25 and rod 26, the latter forming connecting means between the hand latch and dog. The spur wheel 22 is located between upper and lower rods 15 and upon oscillating the lever 21 and properly manipulating the dogs 24 the bar 15 may be moved longitudinally and the members 11 lowered or raised as required.

One set of wheels 12 is adapted to be driven from the motor of the vehicle, and for this purpose a sprocket wheel 27 is fast to the axle carrying the wheels 12 which are fast thereto. A drive chain 28 connects the sprocket wheel 27 with a sprocket wheel 29 loose upon the drive shaft 30 and adapted to be clutchingly engaged therewith through the medium of a key way 29$^a$ in the sprocket wheel 29 and a key 30$^a$ on the drive shaft 30, when it is required to drive the wheels 12 so as to move the vehicle laterally toward or away from the curb when in the act of parking or leaving the space in which the car has been parked. A member 31 operates to clutchingly engage the drive sprocket 29 with the shaft 30 and this member is connected to one end of a lever 32, a rod 33 connecting the opposite end of the lever 32 with a pedal lever 34 which may be operated at will to throw the wheels 12 into or out of gear. The connection between the member 31 and the sprocket wheel 29 is such as to permit the latter to rotate independently of the former. This connection is established by providing the member 31 with a spherical head 31$^a$, by providing the sprocket wheel 29 with an annular groove 31$^b$ which loosely receives the head 31$^a$, and by providing the sprocket wheel 29 with an annular slot 31$^c$ which communicates with the groove 31$^b$ and through which the member 31 passes, as clearly shown in Figures 5 and 6.

When the device is not required for immediate service, the members 11 are folded upwardly beneath the body of the vehicle, and when it is required either to park or clear a parking space the lever 21 is operated to lower the members 11 whereby the vehicle is elevated and the wheels 19 thereof raised to clear the surface after which the lever 34 is actuated to throw the wheels 12 into gear, whereby the vehicle is moved laterally either toward or away from the curb as required.

What is claimed is:—

1. A vehicle parker comprising folding standards, a clevis pivoted to each of the standards, an actuating bar, link connections between said bar and clevices, an operating lever, and a ratchet connection between the said bar and lever, whereby to move the bars intermittently.

2. A vehicle parker comprising folding standards, a clevis pivoted to each of the standards, an actuating bar, longitudinally slotted links connecting said bar and clevises, pins co-acting with the slotted links, and operating means for the said bar.

3. A vehicle parker comprising folding standards, a clevis pivoted to each of the standards, an actuating bar, longitudinally slotted links connecting said bar and clevises, pins co-acting with the slotted links, operating means for the said bar, wheels at the lower end of the standards, connecting means between one of the wheels and the drive mechanism of the vehicle including a clutch, and operating means for the clutch to throw the attachment into or out of gear as required.

In testimony whereof I affix my signature in presence of two witnesses.

OLIVER L. THOMPSON.

Witnesses:
O. P. GOODWIN,
P. M. KILE.